(12) United States Patent
Legallais et al.

(10) Patent No.: US 9,622,280 B2
(45) Date of Patent: Apr. 11, 2017

(54) METHOD AND DEVICE FOR PAIRING DEVICES

(71) Applicant: THOMSON LICENSING, Issy de Moulineaux (FR)

(72) Inventors: Yvon Legallais, Rennes (FR); Damien Bonnet, Rennes (FR); Patrick Fontaine, Rennes (FR)

(73) Assignee: THOMSON LICENSING, Issy les Moulineaux (FR)

( * ) Notice: Subject to any disclaimer, the term of this patent is extended or adjusted under 35 U.S.C. 154(b) by 0 days.

(21) Appl. No.: 14/748,119

(22) Filed: Jun. 23, 2015

(65) Prior Publication Data

US 2015/0382388 A1    Dec. 31, 2015

(30) Foreign Application Priority Data

Jun. 25, 2014   (EP) .................................... 14305999

(51) Int. Cl.
| | | |
|---|---|---|
| H04M 3/16 | (2006.01) |
| H04W 76/02 | (2009.01) |
| H04W 12/06 | (2009.01) |
| H04M 1/725 | (2006.01) |

(52) U.S. Cl.
CPC ..... *H04W 76/023* (2013.01); *H04M 1/72527* (2013.01); *H04W 12/06* (2013.01)

(58) Field of Classification Search
CPC ..... H04W 12/06; H04W 12/00; H04W 4/206; H04W 84/18; H04W 84/20; H04W 8/005; H04W 12/08; H04W 76/02; H04W 76/023

USPC ........ 455/410, 411, 412.1, 414.1, 432.3, 566
See application file for complete search history.

(56) References Cited

U.S. PATENT DOCUMENTS

| | | | |
|---|---|---|---|
| 8,260,261 B2 | 9/2012 | Teague | |
| 2006/0135064 A1 | 6/2006 | Cho et al. | |
| 2009/0286479 A1* | 11/2009 | Thoresson | H04M 1/7253 455/41.3 |
| 2010/0278345 A1* | 11/2010 | Alsina | H04L 63/0492 380/283 |
| 2011/0282785 A1* | 11/2011 | Chin | G06F 3/04883 705/42 |
| 2012/0084738 A1 | 4/2012 | Sirpal | |
| 2013/0065517 A1* | 3/2013 | Svensson | H04W 12/00 455/39 |

(Continued)

FOREIGN PATENT DOCUMENTS

| | | |
|---|---|---|
| EP | 2391109 | 11/2011 |
| EP | 2523439 | 11/2012 |

(Continued)

OTHER PUBLICATIONS

Search Report Dated Dec. 11, 2014.

*Primary Examiner* — Jean Gelin

(57) ABSTRACT

It is provided a method for pairing two devices, one of which is a first device the other is a second device, wherein the method is implemented at the first device, including: generating a pattern to be displayed on either of or both of the first and second devices; sending whole or a part of the tracing pattern to the second device for displaying the tracing pattern on the second device if any; displaying the corresponding pattern on the first device; receiving information indicating the result of tracing the pattern on the second device; and accepting pairing the two devices.

14 Claims, 13 Drawing Sheets

(56) References Cited

U.S. PATENT DOCUMENTS

| | | |
|---|---|---|
| 2013/0169526 A1 | 7/2013 | Gai et al. |
| 2014/0038640 A1 | 2/2014 | Wesselius et al. |
| 2014/0043485 A1 | 2/2014 | Bateman et al. |
| 2014/0343755 A1* | 11/2014 | Rasal .................. B60R 25/209 701/2 |
| 2015/0061856 A1* | 3/2015 | Raman .................. G08B 21/24 340/457 |
| 2015/0215576 A1* | 7/2015 | Pavlov .................. H04N 7/147 348/14.03 |
| 2015/0271312 A1* | 9/2015 | Want .................. H04M 1/7253 455/420 |

FOREIGN PATENT DOCUMENTS

| | | |
|---|---|---|
| JP | 2012175148 | 9/2012 |
| JP | 5409918 | 2/2014 |
| WO | WO2011026097 | 3/2011 |

\* cited by examiner 1401  1403

METHOD AND DEVICE FOR PAIRING DEVICES

TECHNICAL FIELD

The present disclosure relates to a method and a device for pairing devices, and more particularly relates to a method and a device for pairing devices with required level of security.

BACKGROUND ART

A smartphone plays a more and more important role in our daily activities. It is more than a simple communication tool; is increasing its features which bring services for entertainment, lifestyle, health, education or business. In all those categories of application, it may be useful to pair smartphones for sharing information or resources like displays or sensors.

In some cases, it may be necessary to secure this pairing in order to avoid that a third device captures private data or prevents an application from working correctly.

Relating to the concern, different mechanisms exist to secure a device pairing.

- The most used method is based on key sharing (PIN code, passphrase), like in Bluetooth technology.
- Another method is to use the proximity to control the device which is currently pairing, for instance, with NFC which works using magnetic induction.
- Another method for a controller device to identify a pairing device is to detect an event simultaneously with it. This is done, for instance, by making the devices touch each other.
- A device A can authenticate to a device B, if the device B is equipped with a camera like in SiB (Seeing-is-Believing) method.

In entertainment applications, the smartphone coupling allows to share and play content with other users in real time. Samsung provides such a service as Group Play, where several smartphones may be associated to display video with a bigger size.

SUMMARY

The association of smartphones or more generally electronic devices with touch screen capabilities brings new usages. In this disclosure, new user interfaces taking advantages from combination of multi device resources will be explained. That approach leads us to propose a method for device authentication or service launching based on a multiscreen interface. In the disclosure, a user interface is proposed to control the device pairing in a secure and easy-to-use way with a coupling of display devices. Existing interfaces for coupling devices are based on the fact that each device is handled by one user. With the new usages, a single user may handle several devices simultaneously. This is the case, for instance, when two smartphones are coupled to enlarge the display size. In that case, the method allows a user to control the pairing of the devices by reducing user's number of actions. This pairing may be a communication medium association or any application cooperation, i.e. multi device media rendering, games and so on.

According to an aspect of the present disclosure, it is provided a method for pairing two devices, one of which is a which is a first device, the other is a second device, wherein the method is implemented at the first device, comprising: generating a tracing pattern to be displayed on either of or both of the first and second devices; sending whole or a part of the tracing pattern to the second device for displaying the tracing pattern on the second device if any displaying the corresponding tracing pattern on the first device receiving information indicating the result of tracing on the second device; and accepting pairing the two devices according to the information.

According to another aspect of the present disclosure, it is provided a device for pairing two devices, one of which is a first device, the other is a second device, comprising a processor configured to implement: generating a tracing pattern to be displayed on either of or both of the first and second devices; sending whole or a part of the tracing pattern to the second device for displaying the tracing pattern on the second device if any; displaying the corresponding tracing pattern on the first device; receiving information indicating the result of tracing on the second device; accepting pairing the two devices according to the information.

It is to be understood that more aspects and advantages of the invention will be found in the following detailed description of the present disclosure.

BRIEF DESCRIPTION OF THE DRAWINGS

The accompanying drawings, which are included to provide a further understanding of the invention and are incorporated in and constitute a part of this application, will be used to illustrate an embodiment of the invention, as explained by the description. The invention is not limited to the embodiment.

In the drawings.

DESCRIPTION OF EMBODIMENTS

Figure 1:
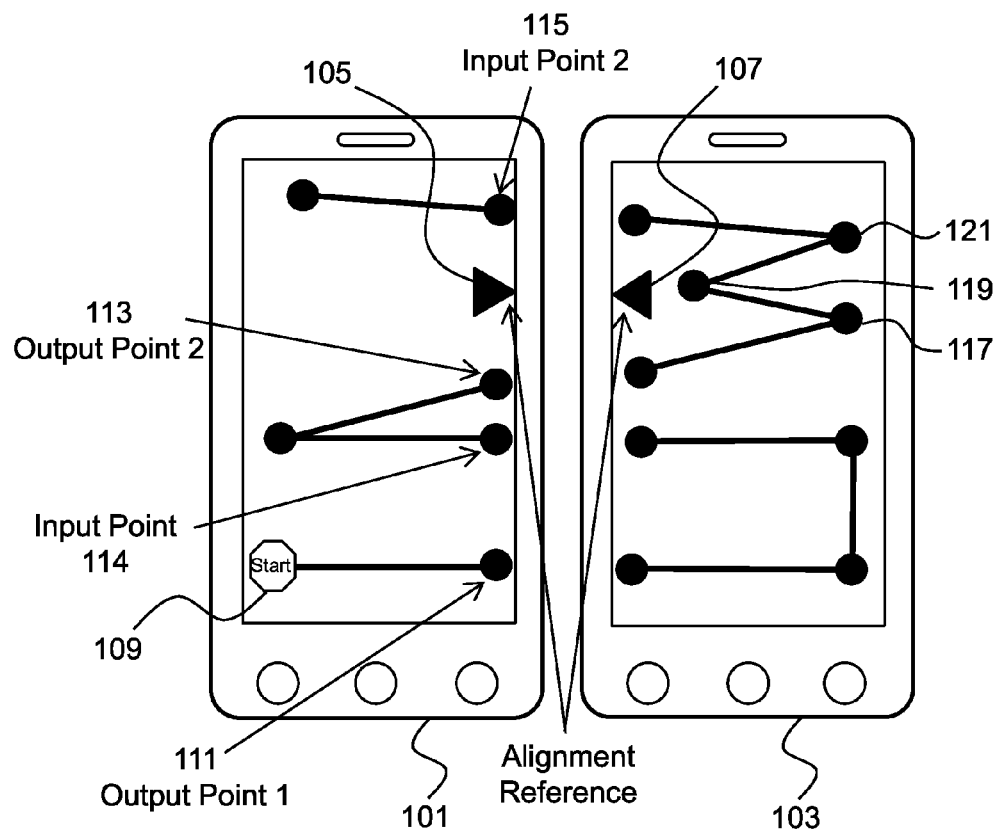
FIG. 1 is a diagram illustrating patterns displayed on the master device 101 and slave device 103 according to the embodiment of the invention.

In the following description, various aspects of an embodiment of the present invention will be described. For the purpose of explanation, specific configurations and details are set forth in order to provide a thorough understanding. However, it will also be apparent to one skilled in the art that the present invention may be implemented without the specific details present herein.

Considering that device pairing is often managed by a single user, this invention uses the combination of screens to provide a user friendly interface for authentication utilizing the detection of traces on both screens in conformance to a reference pattern and within defined time period. To be paired, a device A, considered as a master device, and a device B present a common user interface which allows guarantying to the possessor of the device A that the device which is currently paired is the device B, not another one. The master device A generates a pattern, similar to an unlock screen pattern used commonly, which is delivered to the device B by any type of network such as Bluetooth, WiFi, and so on. This pattern may be a complete pattern or only a part of a pattern to be presented on both screens of the pairing devices. Alternatively, the pattern may be a complete pattern to be presented either of devices. By receiving feedback information describing captured screen trace from the pairing device, the master device is able to determine this information is really generated by the device B.

This embodiment of the invention proposes different variants of methods which may be implemented in function of the required level of security or available device resources (communication network type, screen resolution . . . ).

An authentication is important to share content or resources like displays or sensors, or to synchronize two applications running on two devices. If the authentication is relative to connection set up, a first unsecure data exchange occurs.

In this disclosure, the term of "pairing" indicates an association or a coupling between two devices with a wireless network (like NFC, Wi-Fi, Bluetooth and so on).

During a pairing, one of the devices is considered as the master device. The master device is in charge of:
  generating the pattern to be displayed on either of the master or slave device screen only or on the both screen;
  communicating the screen pattern to the slave device;
  collecting feedback information from the slave device;
  analyzing this information to check the conformance of the user actions to the required traces.

It should be noted that the master device may be indifferently the one from which the pairing is initiated or the device receiving a pairing request. In the following embodiment, the pairing process is initiated by the slave device.

The master and slave devices first establish a communication over a wireless network such as Bluetooth or Wifi, over which the slave device transmits a pairing request. This starting point is either the result of a user action on the interface of an application running on the slave device or of a particular event which activates a service requesting a particular privilege to communicate with the master device. Before requesting a pairing, the slave device must know the master device address for the chosen communication link such as Bluetooth, and Wifi. A device is able to announce its presence over any type of networks via different existing discovery mechanisms. For Bluetooth, a device in discoverable mode transmits the information: device name, class, list of services, features or manufacturer.

The incoming device sends a pairing request to the master device. This request contains information to describe the type of data which could be exchanged after pairing and device features, including screen size and density. In an embodiment, the master device generates a pattern made of two images to be displayed on each screen of the master and slave devices. The master device sends the image or a reference to this image to be displayed to a pairing device and displays its own pattern part. The pattern generator of the master device takes into account the display characteristics such as size and density of the both devices to build a pattern which matches with the surface produced by the two screens when they are placed side by side.

Figure 2:
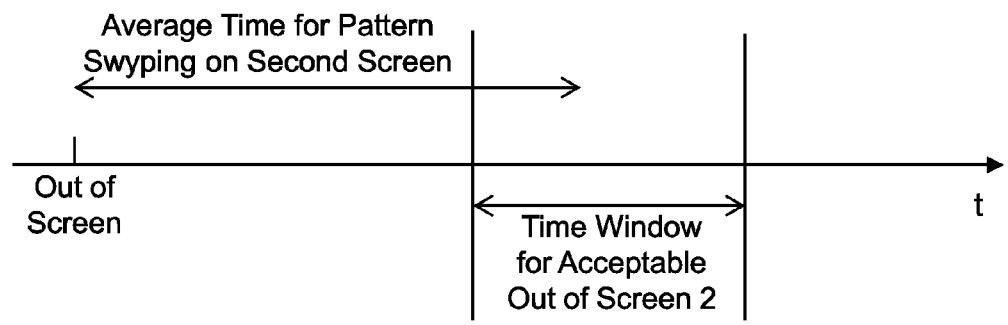
FIG. 2 is a diagram illustrating an embodiment of estimated time according to the invention.
Figure 3:
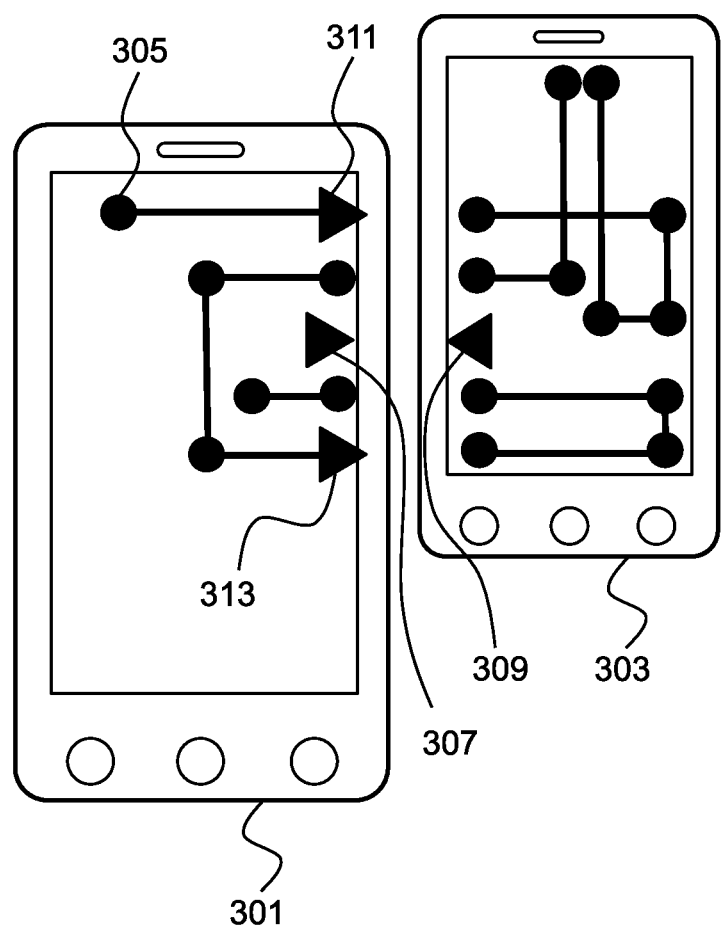
FIG. 3 is a diagram illustrating an alternative solution to indicate the direction for user's trace on the pattern.

FIG. 1 is a diagram illustrating patterns displayed on the master device 101 and slave device 103 according to the embodiment of the invention. Each image on the devices has an indicator to indicate to the user how to place the both devices as an alignment reference 105, 107. With this element, only a user having access to the master display is able to determine the exact path to trace. Moreover, since indicators provide the relative position of the both devices, it is particularly useful when the display sizes are different as shown in FIG. 3. A start indicator 109 is also used on the image of the master device. Since only a user could access to the master device, the user is able to trace the pattern in the right direction. An alternative solution to indicate the direction for user's trace on the pattern is to present arrows on the master device image as indicated in FIG. 3 which will be explained later. Once the pattern is displayed on the both devices, the user is able to align them correctly using the alignment reference 105, 107. The master device detects the alignment of the track of user swipe to the displayed pattern. The time when the user's finger leaves the screen at the output points 111, 113 is recorded for future usage. The slave device then checks the matching between the swipe and the pattern on its own screen. When the user's finger is back on the master screen at the input points 114, 115, the time spent for swiping on the other screen is measured. FIG. 2 illustrates an embodiment of estimated time. If the measured time is not in accordance with the estimated time to swipe the pattern on the slave screen, the pairing is rejected. The time estimation may take into account the length and the complexity of the pattern and the observed swiping speed on the master screen.

In order to improve the reliability of the system, the pattern may go to and from several times between the screens. The pattern of the slave screen may also be associated to notifications when some points are touched by the user. In FIG. 1, notification are sent when the user's finger is touching respectively the points "1", "2" and "3" (117, 119 and 121) of the pattern.

FIG. 3 illustrates an alternative solution to indicate the direction for user's trace on the pattern. In the embodiment, the device 301 is a master device; and the device 303 is a slave device. Two indicators 307, 309 work as alignment references for the devices 301 303 so as to the devices 301, 303 can be placed correctly. The point 305 is able to be recognized as a starting point by presenting arrows 311, 313 on the master device image.

Figure 4:
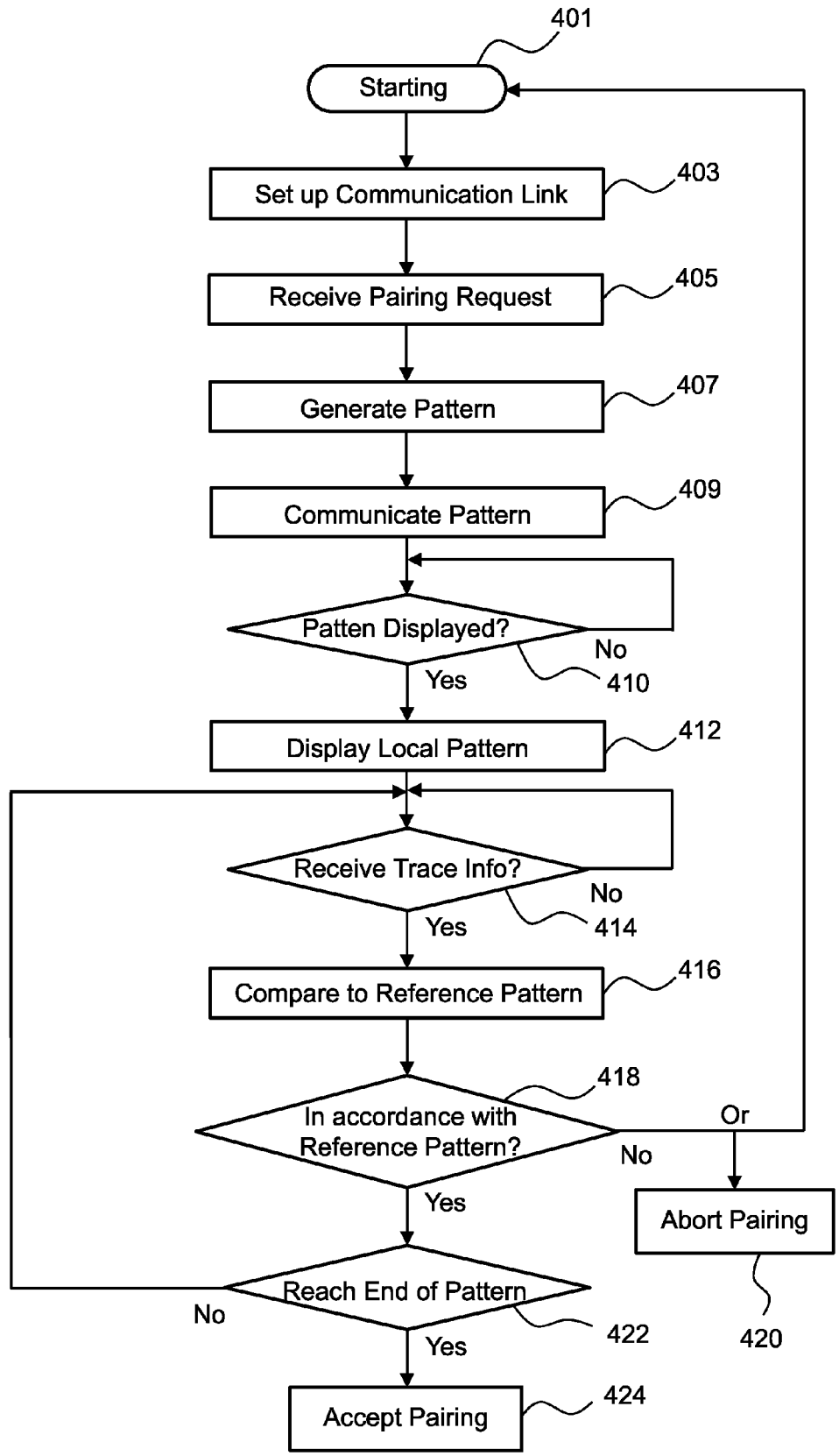
FIG. 4 is a flow chart illustrating a method of paring two devices in a system according to an embodiment of the invention.

FIG. 4 is a flow chart illustrating a method of pairing two devices in a system according to an embodiment. The system could be a master device. At step 401, the procedure starts. At step 403, the system sets up communication link between master and slave devices. At step 405, the system receives a pairing request within the master device from the slave device. At step 407, the system generates a pattern to be displayed on either of the master or slave device screen only or on the both screen. At step 409, with the master device, the system communicates the screen pattern to the slave device. At steps 410 and 412, the pattern is displayed on either of the master or slave device screen only or on the both screen as it is set. If the pattern is not displayed correctly, repeat the step. At step 414, the system receives trace information from the slave device. If the system cannot receive the trace information from the slave device, repeat the same step. At step 416, the system compares the received trace information with required reference pattern. At step 418, the system determines whether the received trace information is in accordance with the reference pattern. If no, go to step 420, and the paring request will be aborted, or return to the step 401. If yes, at step 422, the system determines whether the trace by the user has reached the end of the pattern. If no, return to step 414. If yes, go to step 424, and the paring request will be accepted.

Figure 5:
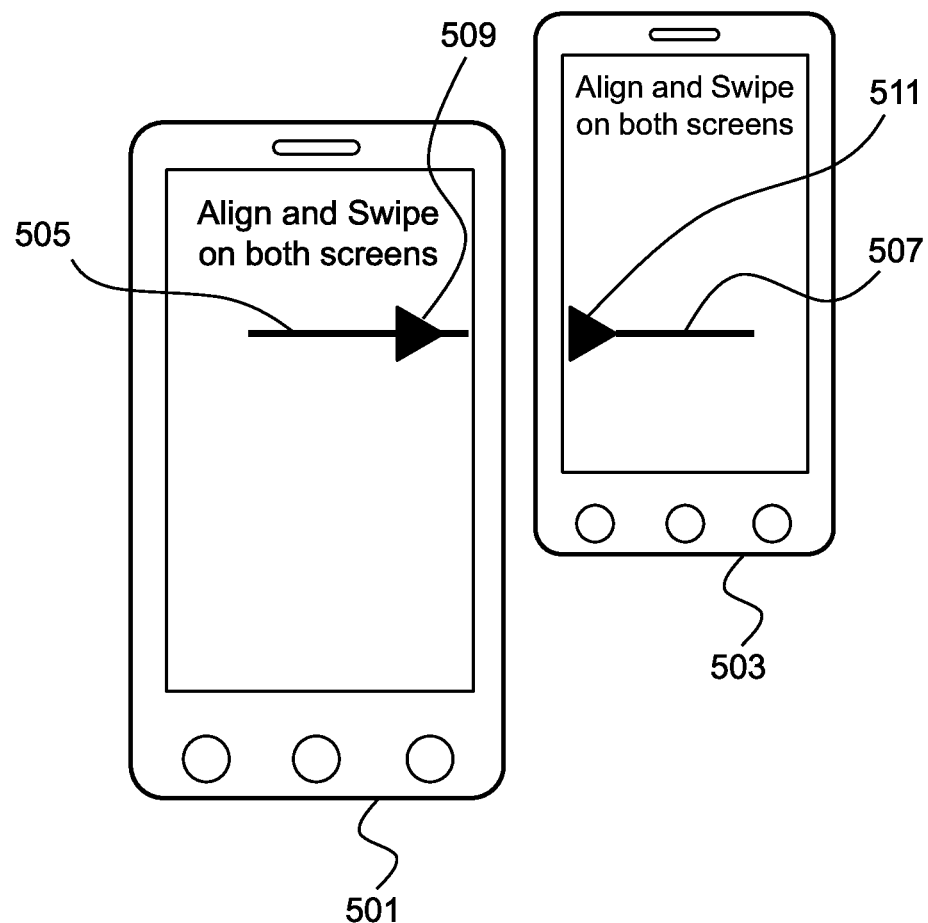
FIG. 5 is a diagram illustrating an example of a simple-time based-pattern for paring two devices as other embodiment.

FIG. 5 illustrates an example of a simple-time based-pattern for paring two devices as an other embodiment. The pattern consists of a single line split 505, 507 on the two screens 501, 503. The device 501 is a master device; and the device 503 is a slave device. The user aligns the pattern 505, 507 (i.e. the line) by placing the devices 501, 503 in the correct position, then the user swipes on the both screens to pair the devices 501, 503. Two indicators 509, 511 could be added to the pattern to indicate a direction for the swipe gesture. Moreover, the indicators 509, 511 are helpful to place the devices 501, 503 in the correct position. In this case, the pairing validation is based on the timing of specific events: reception of a message; and detection of a gesture on the screen. The process is more detailed below.

Figure 6:
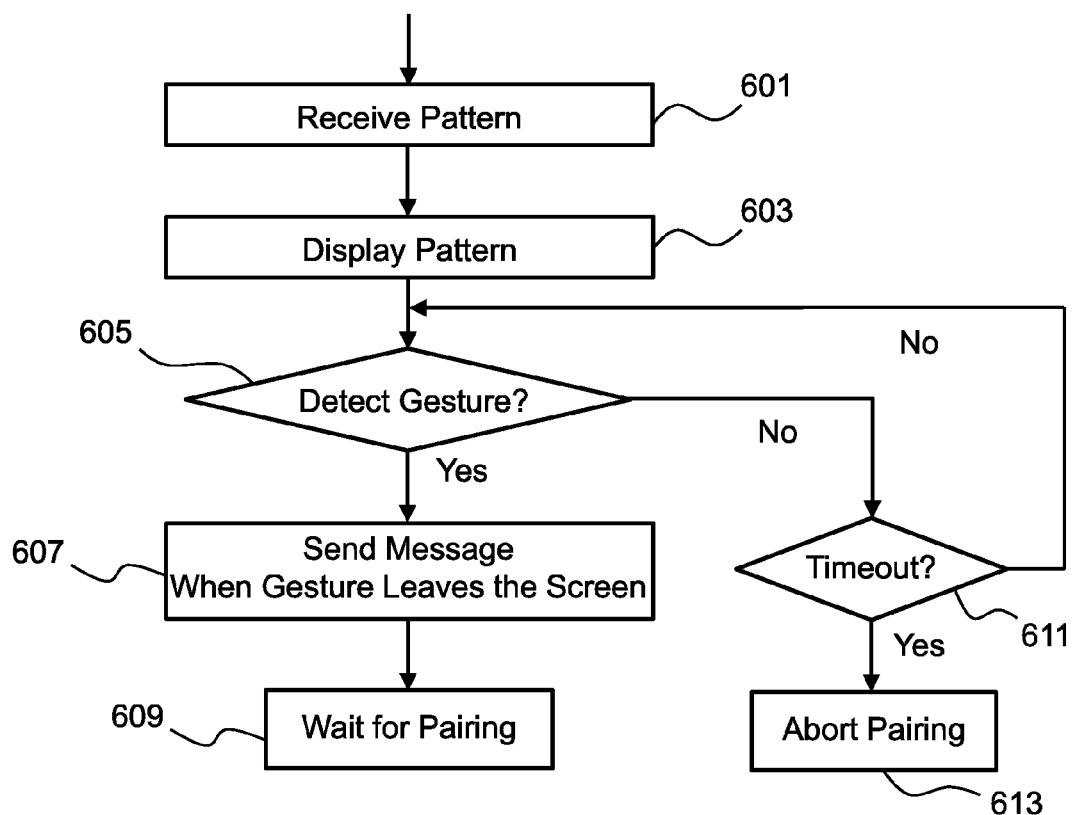
FIG. 6 is a flow chart illustrating a method of paring two devices from the view of a slave device in a system shown in FIG. 5.

FIG. 6 is a flow chart illustrating a method of paring two devices from the view of a slave device in a system shown in FIG. 5. The system processes with the slave device the following steps. At step 601, the slave device receives the pattern from the master device. At step 603, the slave device displays the pattern. At step 605, the slave device detects the swipe gesture on the screen. If the swipe gesture is not detected, go to step 611. After detecting the swipe gesture on the screen, at step 607, the slave device sends a message to the master device when the swipe "leaves" the screen. The message is sent by the slave device "immediately" after the detection of the swipe leaving the screen. The message can include an indication of absolute or relative time. At step 609, the slave device wait until pairing request is accepted by the master device. At step 611, if the slave device does not detect the swipe gesture within a predetermined time, go to step 613 and the paring request will be aborted. If still within a predetermined time, go back to step 605.

Figure 7:
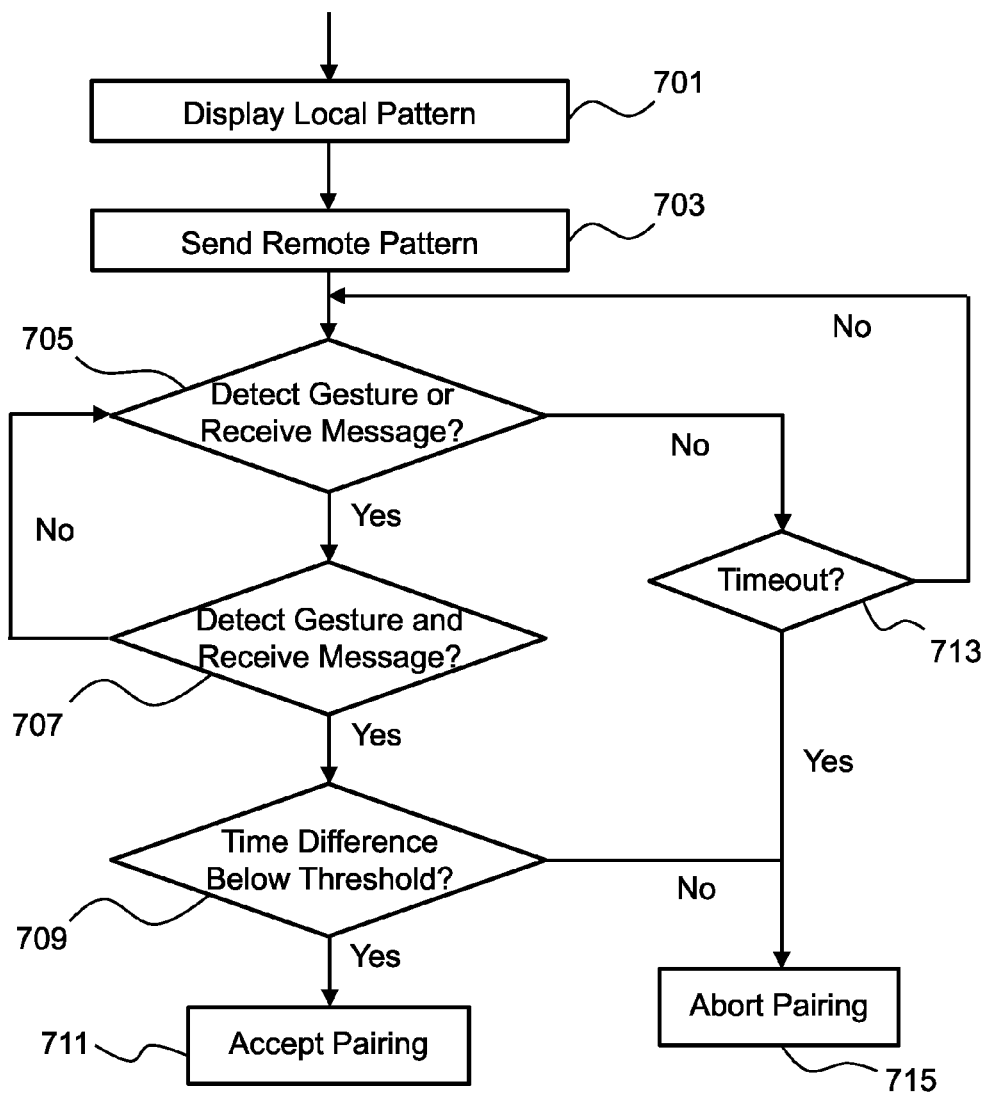
FIG. 7 is a flow chart illustrating a method of paring two devices from the view of a master device in a system shown in FIG. 5.
Figure 8:
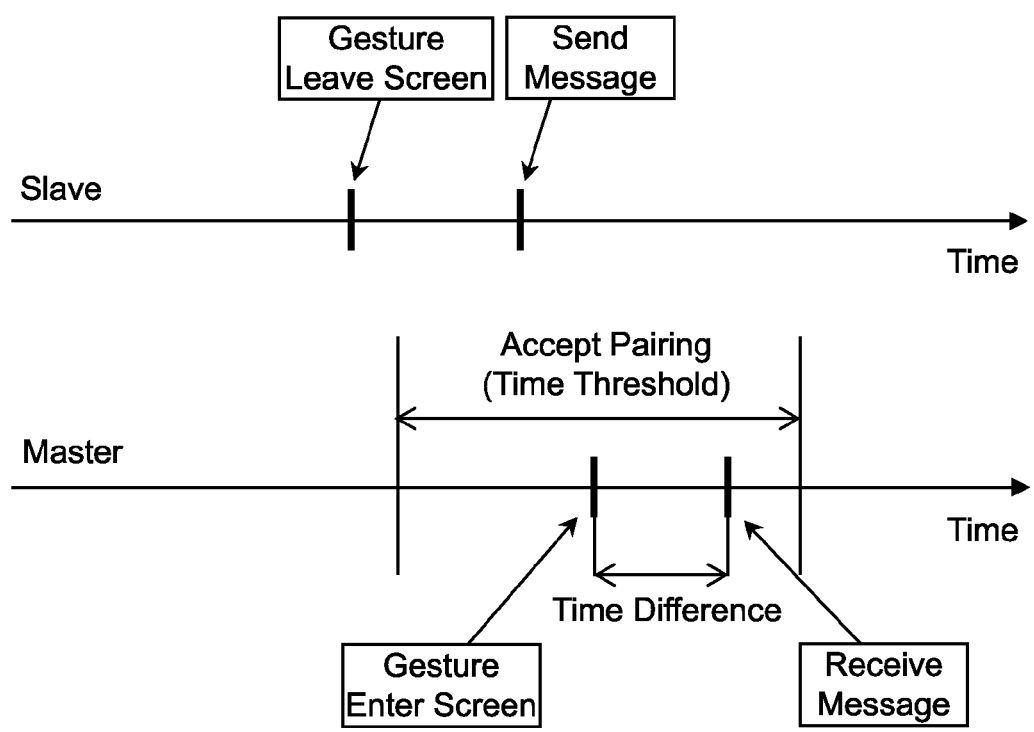
FIG. 8 is a diagram illustrating relationship between time information and a threshold according to the embodiment of the invention.

FIG. 7 is a flow chart illustrating a method of paring two devices from the view of a master device in a system shown in FIG. 5. The system processes with the master device the following steps. At step 701, the master device displays the local pattern. At step 703, the master device sends the remote pattern to the slave device (or broadcast the pattern). At step 705 and 707, the master device waits for a swipe gesture and for a message. When the master device detects a swipe gesture on the screen corresponding to the pattern, it records the absolute or relative time. When the master device receives a message from the slave device, it records the absolute or relative time of reception of the message. At step 709, if the difference between the two time information (i.e. the one from the local gesture detection and the one from the message reception) is below a threshold, then the pairing is accepted at step 711. If the difference is not below the threshold, go to step 715. The threshold can be set to 100 ms for example, in order to prevent a third device from pairing instead of the slave device. It should be noted that if two messages are received below the threshold, the pairing is abandoned. The process can be repeated. If the master device does not detect a swipe gesture or receive message at step 705, go to step 713. If it is timeout at step 713, go to step 715. If it is still within a predetermined time, go to step 705. At step 715, the pairing request is aborted. FIG. 8 is a diagram illustrating relationship between time information and a threshold according to the embodiment of the present invention.

Figure 9:
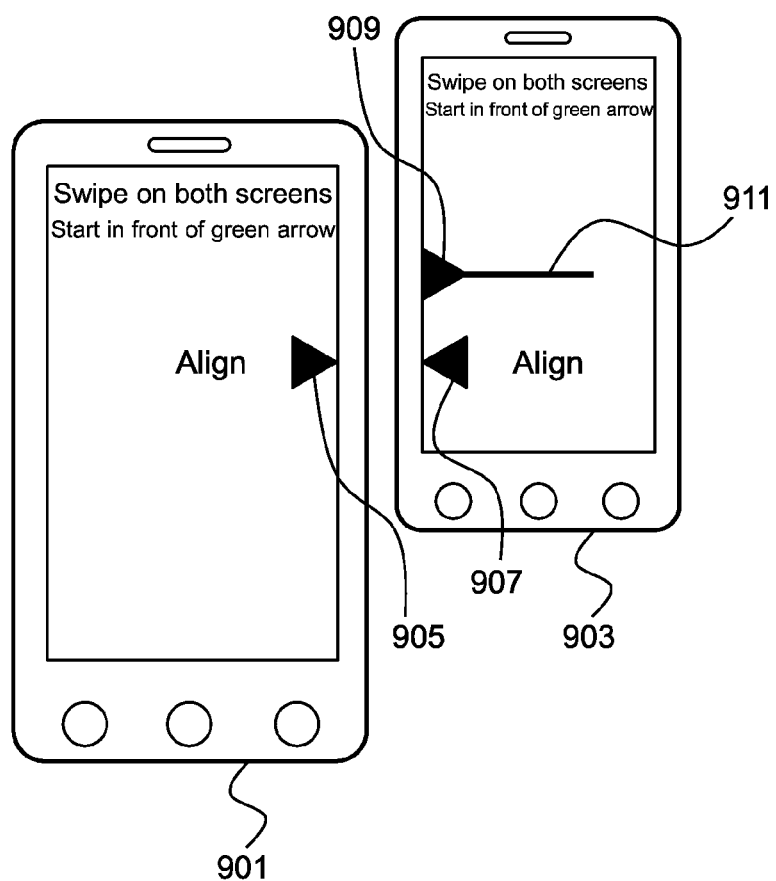
FIG. 9 illustrate example of code patterns for pairing two devices according to the invention.
Figure 10:
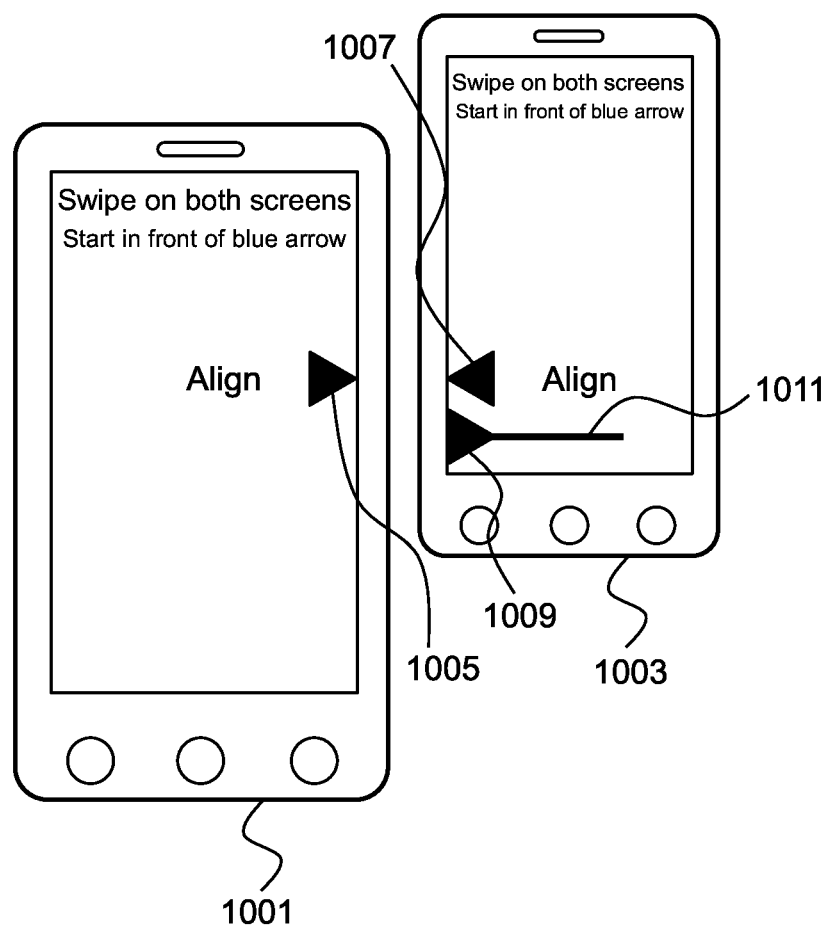
FIG. 10 illustrate example of code patterns for pairing two devices according to the invention.
Figure 11:
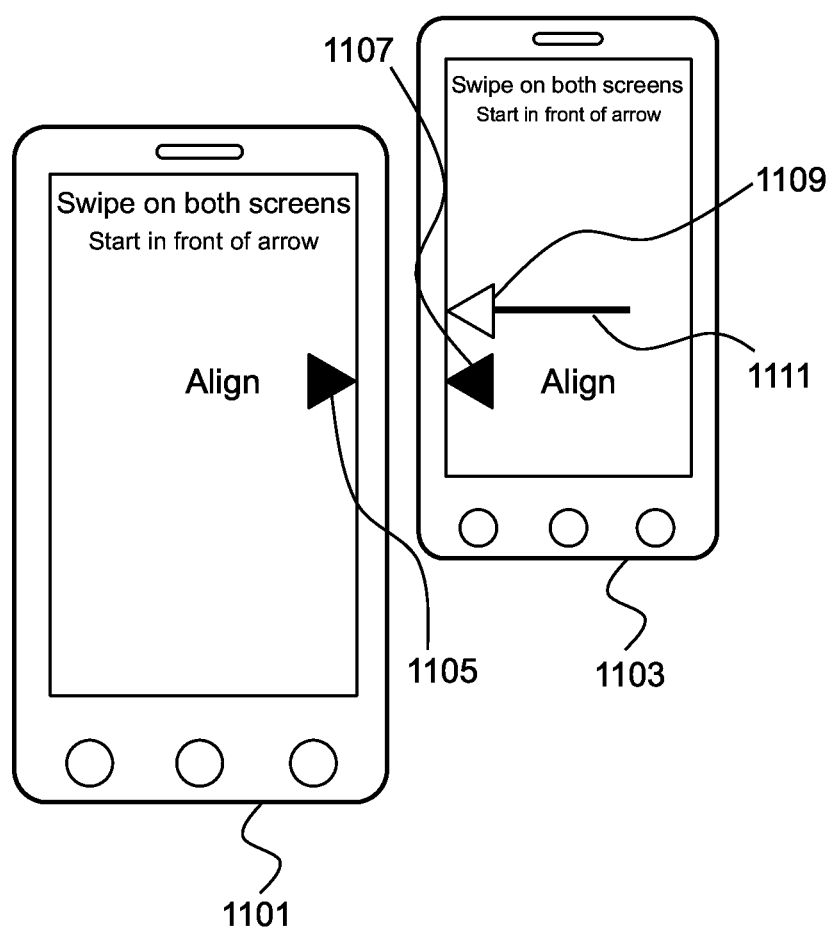
FIG. 11 illustrate example of code patterns for pairing two devices according to the invention.

As an alternative, FIG. 9, FIG. 10 and FIG. 11 illustrate examples of code patterns for pairing two devices. Each pattern consists of:
  an alignment symbol displayed on each of the two screens in order to place the devices in correct position;
  a gesture pattern displayed only on the master device (therefore unknown by other devices than the master device).

The user has to align the symbol (e.g. red arrow) 905, 907, 1005, 1007, 1105, 1107 by placing the devices in the correct position, then the user swipes on both screens to pair the devices. In these embodiments, the devices 903, 1003, 1103 are master devices; and the devices 901, 1002, 1101 are slave devices. An indicator 909, 1009, 1109 (e.g. green, blue, yellow arrows) can be added to the pattern 911, 1011, 1111 to indicate a direction for the swipe gesture. The swipe process has to be started in front of the indicator 909, 1009, 1109, by the user, that is, the user have to swipe on both screen even if the code pattern is displayed on only the master device. The swipe process could be repeated several times while changing the position of the indicator 909, 1009, 1109 in order to increase the security.

Figure 13:
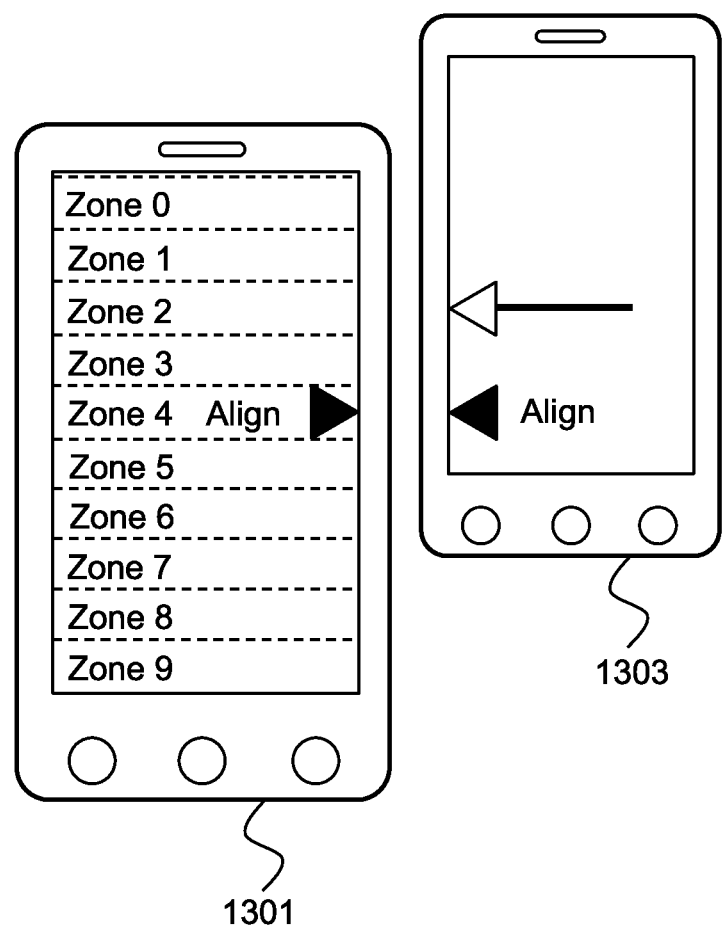
FIG. 13 is a diagram illustrating divided multiple zones according to the embodiment of the invention.

In these embodiments, the pairing validation is based on the positions of the gesture detections for a specific pattern sequence. The process is explained in detail below:

On the slave device 901, 1002, 1101, the process including:
  receiving the pattern (alignment symbol) 905, 1005, 1105 from the master device 903, 1003, 1103;
  displaying the pattern, as an option, displaying zones as described in FIG. 13;
  detecting the swipe gesture on the screen (the swipe process has to be started in front of the indicator 909, 1009, 1109, by the user);
  sending a message to the master device 903, 1003, 1103 when the swipe "leaves" the screen;

The message is sent by the slave device 901, 1002, 1101 after the detection of the swipe leaving the screen. The message includes the position of gesture leaving the screen. The message may include the characteristics of the display such as screen size and density.

On the master device 903, 1003, 1103, the process including:
  displaying the local pattern 911, 1011, 1109;
  sending the remote pattern (alignment symbol) 905, 1005, 1105 to the slave device 901, 1002, 1101 (or broadcast the pattern);
  waiting for a message and optionally for a swipe gesture.

As an option, when it detects a swipe gesture on the screen corresponding to the pattern, it checks the position; when it receives a message from the slave device, it records the position of the gesture indicated in the message.

If the position indicated in the message corresponds to the calculated position corresponding to the gesture pattern and the alignment symbol, then the pairing step is validated. The process could be optionally repeated with a new position of the gesture pattern. As an alternative, the alignment symbol position could also be changed. After a number of correct patterns, the pairing is validated. The security is improved by increasing the number of patterns (i.e. 4 patterns). It should be noted that in order to prevent a third device from pairing instead of the slave device:

- only the first received message is taken into account in order to prevent a third device to repeat the same message;
- if a message is received with a wrong position, a new gesture is sent and the current gesture is abandoned; and
- after several failures, the pairing is aborted.

The position validation can be implemented in different ways.

Figure 12:
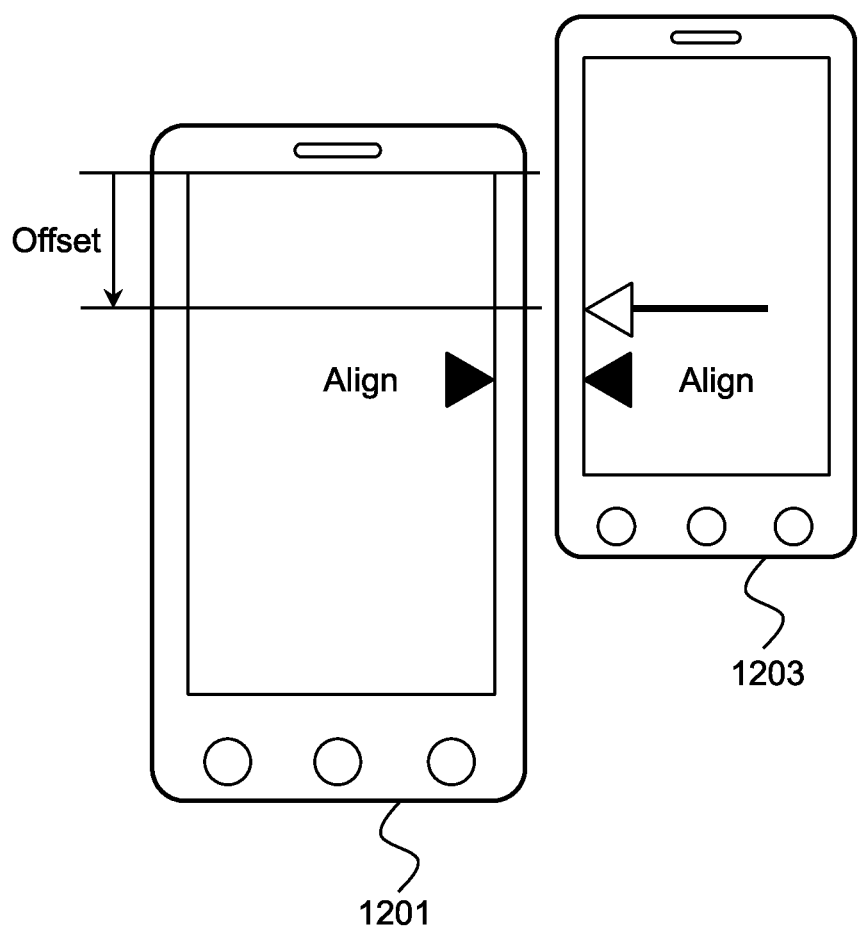
FIG. 12 is a diagram illustrating pixel offset of the gesture according to the embodiment of the invention.

A first solution is that the slave device 1201 sends the pixel offset of the gesture leaving the screen from the top of the screen as described in. FIG. 12. Then the master device 1203 can calculate the expected offset based on slave and master devices' screens (size and density), and offset of the alignment symbol and offset of the gesture pattern. The position can be validated with a tolerance error (e.g. +/− 10 pixels), based on the screen size and density.

A second solution is that the screen of the slave device 1301 can be divided in multiple zones. For example it can be divided in 10 zones as shown in FIG. 13. It also could be divided in 100 or 1000 zones. The slave device 1301 sends the zone number corresponding of the gesture leaving the screen (in this case: Zone #2). The master device can calculate the expected zone number based on slave and master devices' screens (size and density), and offset of the alignment symbol and offset of the gesture pattern.

As an alternative embodiment, both techniques, that is, time based and code based pairing can be combined in the same process in order to increase the security of the pairing. In that case, both constraints must be satisfied to validate the pairing:

- the time difference between a message and its corresponding gesture detection on the screen;
- the position of gesture detection on the slave and its corresponding pattern displayed on the master.

Figure 14:
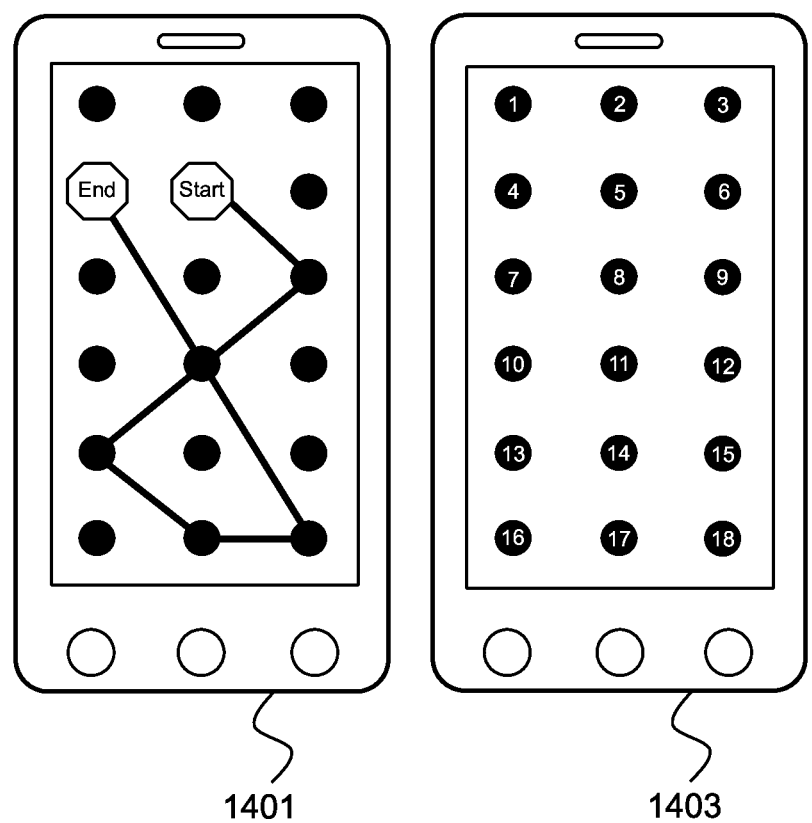
FIG. 14 depicts an alternative embodiment where time based on code based pairing can be combined in the same process.

A last proposal is to display the pattern on the main screen 1401. Since the user is in front of the both devices 1401, 1403, the user can draw on the second device 1403 the figure presented on the first one. The second device 1403 is sending then the sequence of points which have been reached by the user's finger. Since the sequence is transmitted without scrambling, only the first received message can be accepted for pairing request. In the embodiment of FIG. 14 the accepted sequence for pairing is {5,9,13,17,11,4}.

The processor implementing the invention may be provided in electronic devices such as smartphones, and the electronic devices may act as either a master device or a slave device accordingly. If several devices may be associated to display video with a bigger size, a plurality of slave devices can be used in accordance with the invention.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this application and are within the scope of the invention as defined by the appended claims.

As will be appreciated by one skilled in the art, aspects of the present principles can be embodied as a system, method or computer readable medium. Accordingly, aspects of the present principles can take the form of an entirely hardware embodiment, an entirely software embodiment (including firmware, resident software, micro-code, and so forth), or an embodiment combining software and hardware aspects that can all generally be referred to herein as a "circuit," "module", or "system." Furthermore, aspects of the present principles can take the form of a computer readable storage medium. Any combination of one or more computer readable storage medium(s) may be utilized.

A computer readable storage medium can take the form of a computer readable program product embodied in one or more computer readable medium(s) and having computer readable program code embodied thereon that is executable by a computer. A computer readable storage medium as used herein is considered a non-transitory storage medium given the inherent capability to store the information therein as well as the inherent capability to provide retrieval of the information therefrom. A computer readable storage medium can be, for example, but is not limited to, an electronic, magnetic, optical, electromagnetic, infrared, or semiconductor system, apparatus, or device, or any suitable combination of the foregoing. It is to be appreciated that the following, while providing more specific examples of computer readable storage mediums to which the present principles can be applied, is merely an illustrative and not exhaustive listing as is readily appreciated by one of ordinary skill in the art: a portable computer diskette; a hard disk; a read-only memory (ROM); an erasable programmable read-only memory (EPROM or Flash memory); a portable compact disc read-only memory (CD-ROM); an optical storage device; a magnetic storage device; or any suitable combination of the foregoing.

Thus, for example, it will be appreciated by those skilled in the art that the block diagrams presented herein represent conceptual views of illustrative system components and/or circuitry embodying the principles of the invention. Similarly, it will be appreciated that any flow charts, flow diagrams, state transition diagrams, pseudo code, and the like represent various processes which may be substantially represented in computer readable storage media and so executed by a computer or processor, whether or not such computer or processor is explicitly shown.

The invention claimed is:

1. A method for pairing two devices, one of which is a first device, the other is a second device, wherein the method is implemented at the first device, comprising:
   - generating a tracing pattern to be displayed on either one of or both of the first and second devices;
   - generating a pair of indicators for alignment references to be displayed on each of the first and second devices;
   - sending whole or a part of the tracing pattern for displaying the tracing pattern on the second device if any and the indicator to the second device;
   - displaying the corresponding tracing pattern and the indicator on the first device;
   - receiving information indicating the result of tracing on the second device; and accepting pairing the two devices according to the information wherein even if the tracing pattern is displayed on only the first device, tracing of the tracing pattern is started in front of the tracing pattern utilizing the pair of indicators so as to swipe the second device in the right position.

2. The method according to claim 1, wherein the accepting comprising:
comparing the information with the tracing pattern;
determining if the information satisfies a condition;
if yes, accepting pairing the two devices.

3. The method of the claim 1, wherein the pairing is requested by the second device or by the first device itself, or triggered by a particular event.

4. The method of claim 1, wherein the condition is relating to time and trace, wherein the time for swiping is calculated on the basis of output and input points of swipe.

5. The method of claim 1, wherein the first device could be paired not only with one second device but also with a plurality of second devices simultaneously.

6. Computer program downloadable from a communication network, recorded on a non-transitory medium readable by computer, and executable by a processor, comprising program code instructions for implementing a method according to claim 1.

7. Non-transitory computer-readable medium comprising a computer program recorded thereon and capable of being run by a processor, including program code instructions for implementing a method according to claim 1.

8. A device for pairing two devices, one of which is a first device, the other is a second device, comprising a processor configured to implement:
generating a tracing pattern to be displayed on either one of or both of the first and second devices;
generating a pair of indicators for alignment references to be displayed on each of the first and second devices;
sending whole or a part of the tracing pattern for displaying the tracing pattern on the second device if any and the indicator to the second device;
displaying the corresponding tracing pattern and the indicator on the first device;
receiving information indicating the result of tracing on the second device;
accepting pairing the two devices according to the information wherein even if the tracing, pattern is displayed on only the first device, tracing of the tracing pattern is started in front of the tracing pattern utilizing the pair of indicators so as to swipe the second device in the right position.

9. The device of the claim 8, wherein the accepting comprising:
comparing the information with the tracing pattern;
determining if the information satisfies a condition;
if yes, accepting pairing the two devices.

10. The device of claim 8, wherein the pairing is requested by the second device or by the first device itself, or triggered by a particular event.

11. The device of claim 8, wherein the condition is relating to time and trace, wherein the time for swiping is calculated on the basis of output and input points of swipe.

12. The device of claim 8, wherein the first device could be paired not only with one second device but also with a plurality of second devices simultaneously.

13. A second device to be paired with a first device, comprising a processor configured to implement:
receiving whole or a part of a tracing pattern and an alignment reference from the first device if any;
displaying the received tracing pattern and the alignment reference on the second devices;
detecting the tracing on the screen of the second device;
sending information indicating the result of tracing on the second device to the first device;
waiting until paring is accepted by the first device according to the information.

14. The second device of claim 13 further including displaying one of a pair of indicator on the second devices for alignment references.

* * * * *